S. R. BEAL & J. D. CRANDELL.
VENDING MACHINE.
APPLICATION FILED DEC. 12, 1910.

1,025,235.

Patented May 7, 1912.
5 SHEETS—SHEET 1.

Witnesses
Chas. W. Gustav
Grace E. Wynkoop

Inventors
Samuel R. Beal
James D. Crandell
By S. E. Thomas
Attorney

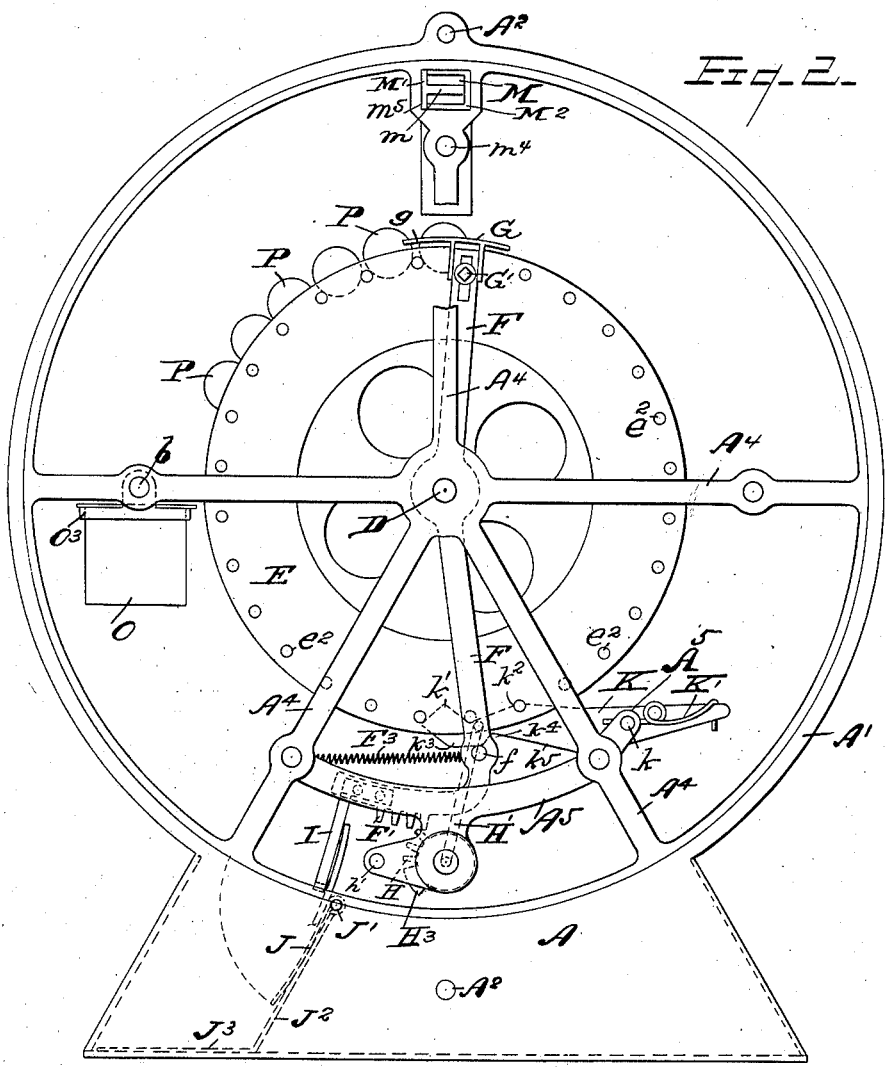

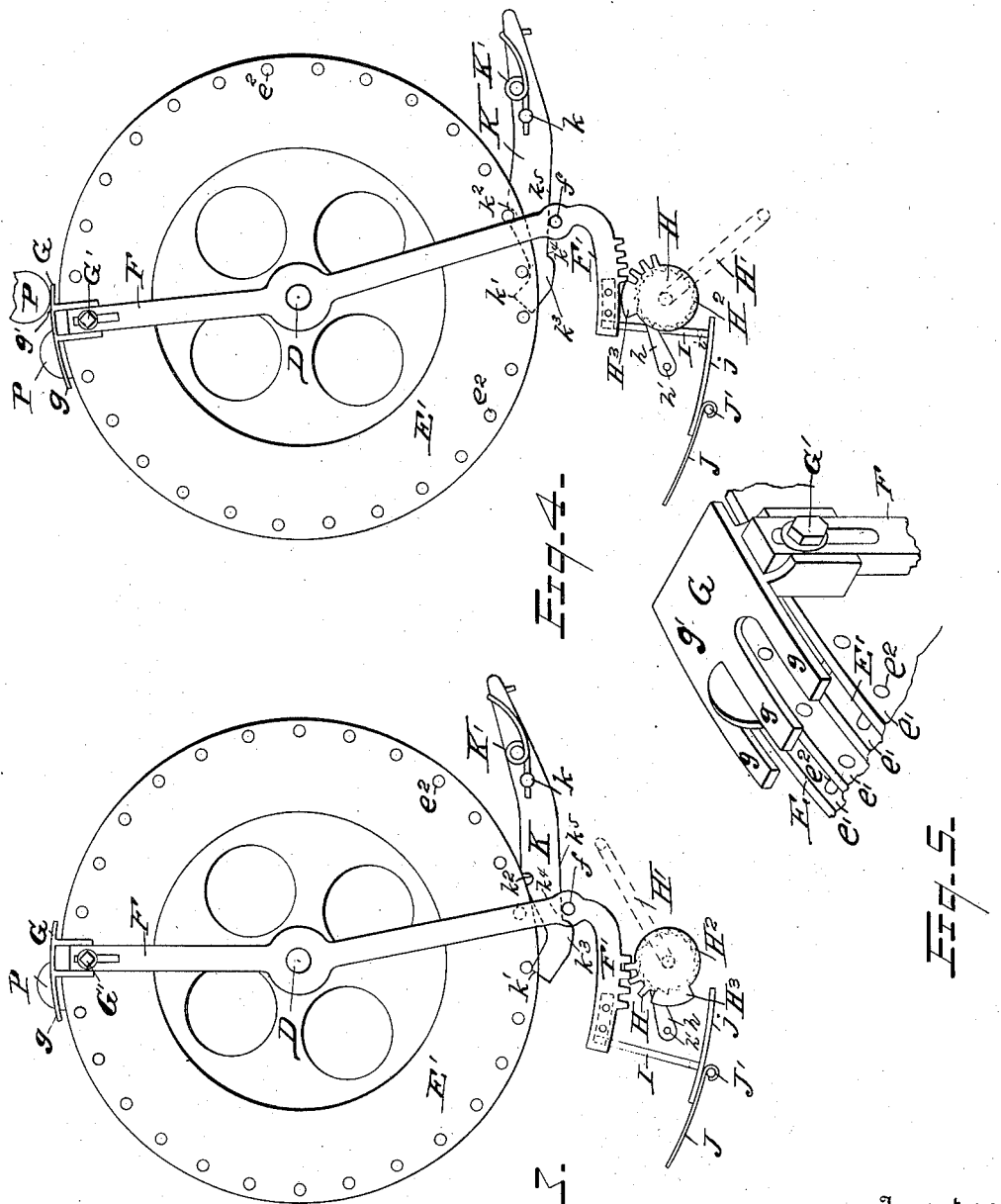

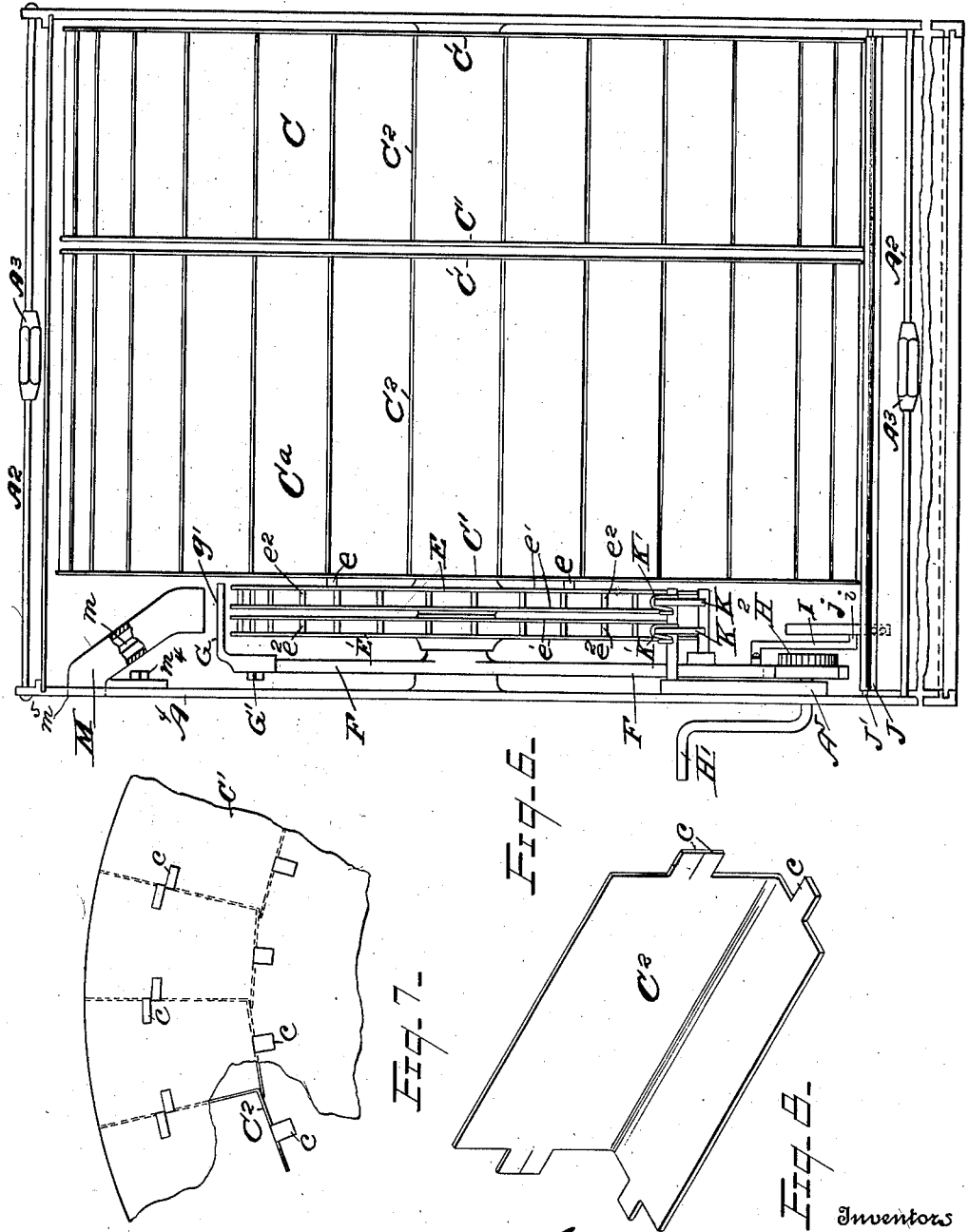

S. R. BEAL & J. D. CRANDELL.
VENDING MACHINE.
APPLICATION FILED DEC. 12, 1910.
1,025,235.
Patented May 7, 1912.
5 SHEETS—SHEET 5.
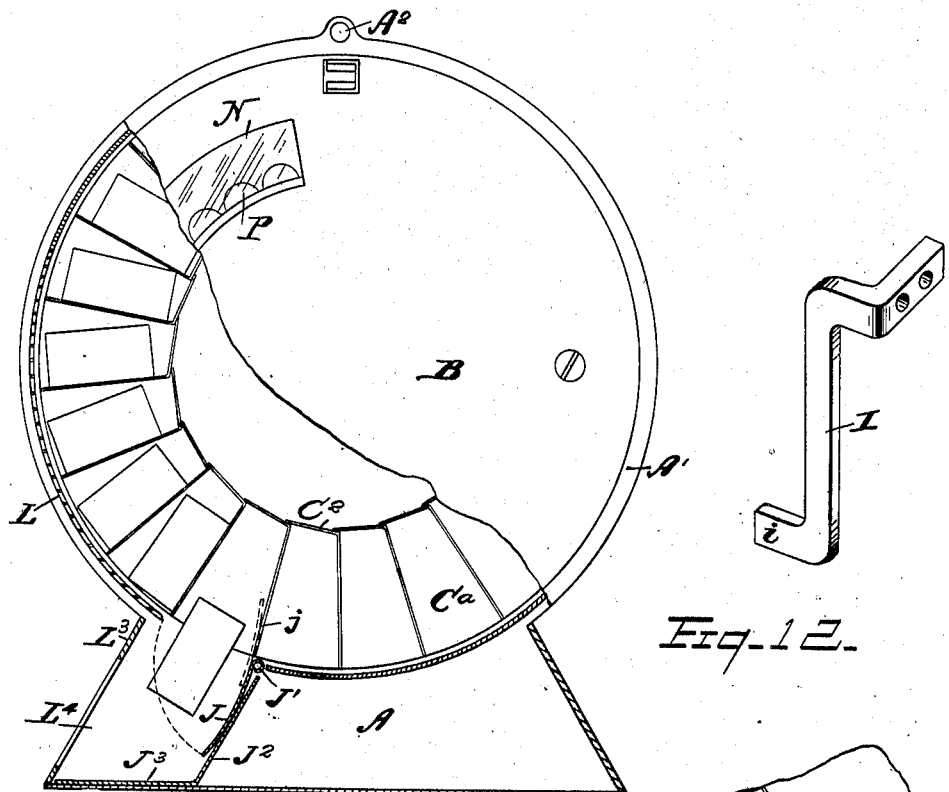
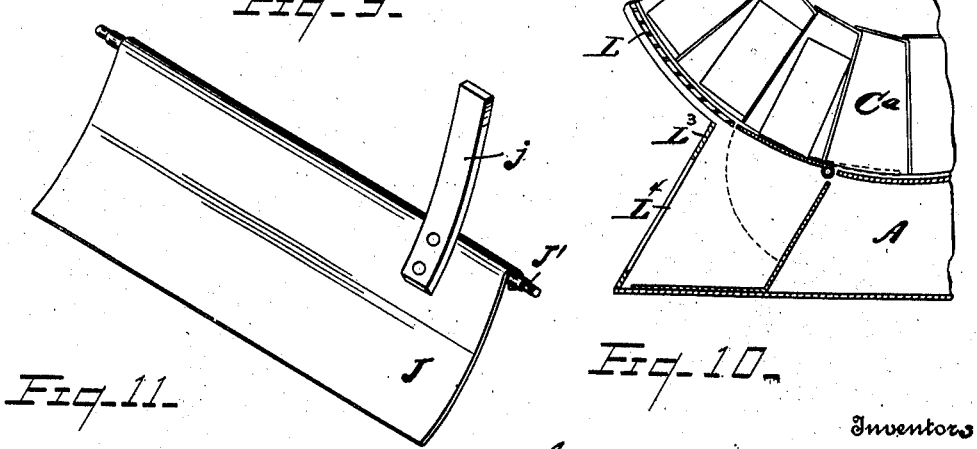
Witnesses
Chas. W. Gustavus
Grace E. Wynkoop
Inventors
Samuel R. Beal
James D. Crandell
By J. E. Thomas
Attorney

UNITED STATES PATENT OFFICE.

SAMUEL R. BEAL AND JAMES D. CRANDELL, OF ADRIAN, MICHIGAN, ASSIGNORS TO THE ADRIAN NOVELTY CO., OF ADRIAN, MICHIGAN, A CORPORATION OF MICHIGAN.

VENDING-MACHINE.

1,025,235.　　　　Specification of Letters Patent.　　　Patented May 7, 1912.

Application filed December 12, 1910. Serial No. 596,764.

*To all whom it may concern:*

Be it known that we, SAMUEL R. BEAL and JAMES D. CRANDELL, citizens of the United States, residing at Adrian, county of Lenawee, State of Michigan, have invented a certain new and useful Improvement in Vending-Machines, and declare the following to be a full, clear, and exact description of the same, such as will enable others skilled in the art to which it pertains to make and use the same, reference being had to the accompanying drawings, which form a part of this specification.

Our invention relates to an improvement in vending machines and it consists in the general construction and arrangement of parts in which the merchandise contained in the machine is subject to delivery only upon the insertion of a coin of a predetermined denomination representing the purchase price of the article offered for sale,—the arrangement being such that the coöperation of said coin is essential to the operation of the delivery mechanism which is adapted to make one delivery only for each coin inserted in the machine.

Among the objects attained by this invention is the reduction of the cost of manufacture largely through the simplicity of its construction, and the employment of a minimum number of parts, rendering the device easy to operate and reliable in action.

Other advantages and improvements will hereafter appear.

Figure 1:
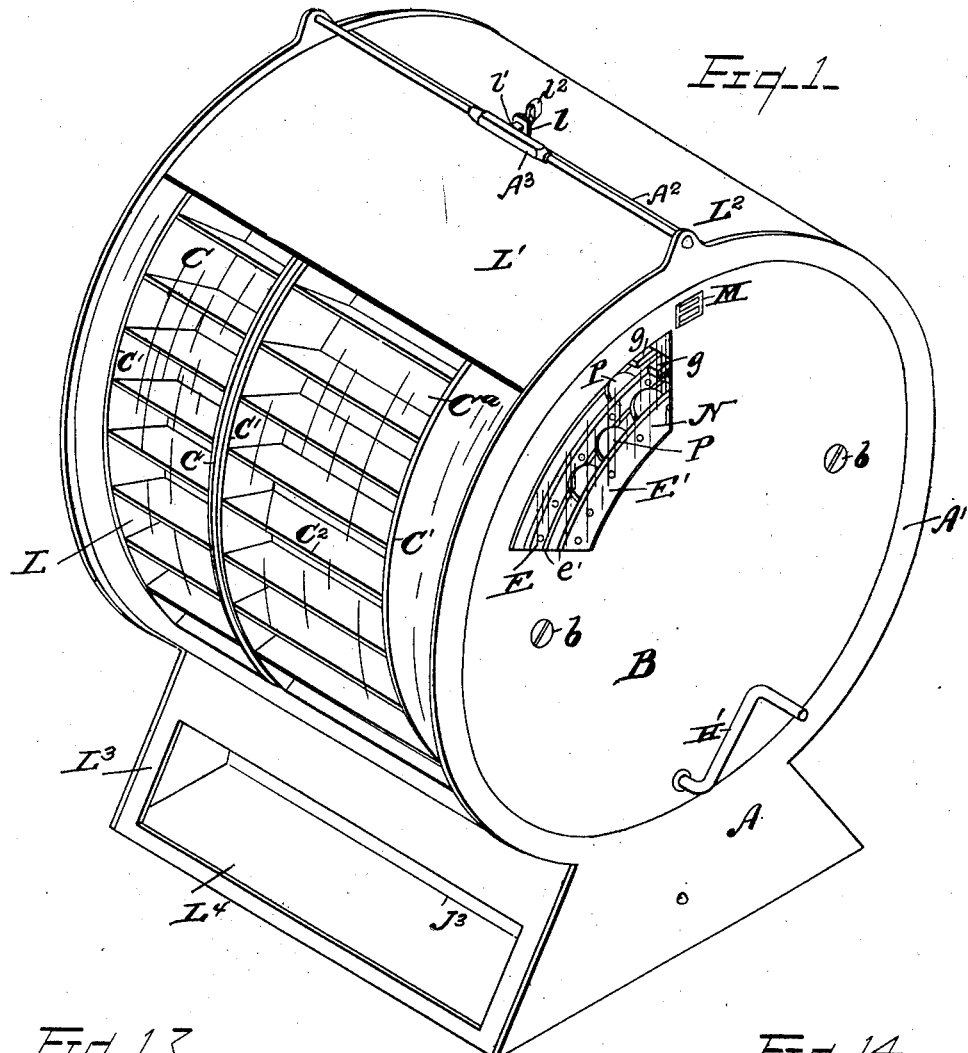
Figure 13:
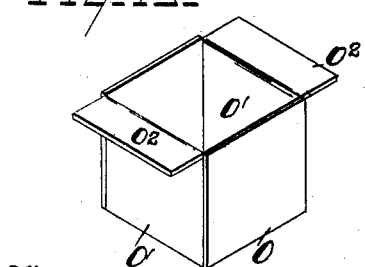
Figure 14:
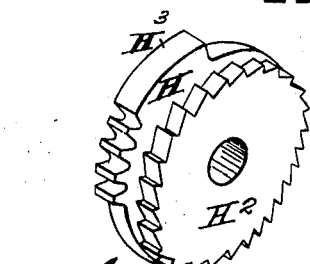

In the drawings accompanying this specification: Figure 1 is a perspective view of the machine. Fig. 2 is an end elevation of the machine with the end walls removed to show the operating mechanism which is in its normal position. Fig. 3 is a detail view in elevation of the revolving coin disk and its operating mechanism, showing the fork of the operating lever engaging the coin in the act of rotating the merchandise drum (not shown),—the locking dog being in released position. Fig. 4 is a similar view to that shown in Fig. 3, showing the operating lever at the limit of its movement and the dog locking the coin disk against accidental rotation. Fig. 5 is a fragmentary perspective view showing the adjustable forked member engaging the coins secured to the top of the operating lever. Fig. 6 is a rear elevation of the machine,—the outer wall being removed to show the coin disk, merchandise drum, and other mechanism. Fig. 7 is a fragmentary elevation of the merchandise drum showing the manner of forming the pockets and the means employed to secure the same in the end walls of the drum. Fig. 8 is a perspective view of one of the walls forming the pockets of the merchandise drum, showing more particularly the construction of the ears integral therewith for securing the pocket to the side wall of the drum. Fig. 9 is an end elevation with parts broken away and a portion of the merchandise drum in cross-section showing a package in the act of being discharged from the drum. Fig. 10 is a fragmentary cross-sectional detail showing the position of the discharge door when the machine is being filled with merchandise,—the door being raised so that the drum may be rotated without emptying the pockets. Fig. 11 is a perspective view of the discharge door. Fig. 12 is a detail perspective view of the arm secured to the operating lever through which the discharge door is actuated. Fig. 13 is a perspective view of the coin box. Fig. 14 is a detail perspective view of the combined gear and ratchet serving to actuate the operating lever. Fig. 15 is a detail perspective view of the turnbuckle connected with the rods engaging the side walls of the machine and the locking device employed in connection therewith to secure the arc-shaped cover. Fig. 16 are detail perspective views of a pair of castings composing the coin chute.

Referring now to the letters of reference placed upon the drawings: A, A, are end walls of the machine, the outer portion being in the form of an annular ring $A'$. The walls A are connected together by rods $A^2$, $A^2$, brought under tension by the turnbuckle $A^3$.

$A^4$ is a spider frame intersecting the annular ring and integral therewith,—the arms serving as supports for the disk-shaped side walls B secured to the spider frame by the screws $b$.

C and $C^a$ are merchandise drums supported on the shaft D journaled in the hub of the spider frame $A^4$;—the drum C being engaged with the shaft while the drum $C^a$ is free to turn thereon.

$C'$ are the side walls of the drums.

$C^2$ are L-shaped partitions forming pockets in the drums to receive the merchandise and are provided with ears $c$ adapted to pass through slots in the side walls $C'$, being bent as indicated in Fig. 7, to secure the partitions in place.

E, E', are coin disks mounted on the shaft D. The coin disk E being loosely mounted on the shaft but secured to the merchandise drum $C^a$ in order to turn therewith, by means of the pins $e$ engaging the disk with the drum. The coin disk E' is secured to the shaft D,—the rotation of which results in the rotation of the drum C which is also secured to the shaft. The coin disks E and E' are composed of side plates $e'$, $e'$, spaced apart and held in spaced relation by pins $e^2$ engaging the plates equidistant from each other,—the space between forming a plurality of coin pockets equal in number to the pockets in the merchandise drums.

F is a swinging lever mounted on the shaft D and provided at the top with a forked casting G formed with three tines $g$,—the spaces between the tines being directly in line with the path of the coin pockets of the disks E and E'. The casting G is provided with a table $g'$ on which the coin may drop should it be deposited in the machine when the operating lever is in other than its normal position,—the object being to insure the proper operation of the merchandise drum upon the deposit of each coin, as will be hereafter more fully explained. The forked member G may be adjusted with respect to the end of the operating lever F by means of the bolt $G'$ which engages the member G through the slotted end of the lever. Projecting from the lower arm of the lever F is an arc-shaped mutilated rack bar F'.

H is a mutilated gear mounted on the shaft of the crank arm H' in turn journaled in the arc-shaped bar $A^5$, bolted or otherwise secured to the arms of the spider frame $A^4$, as shown in Fig. 2.

$H^2$ is a ratchet wheel which may be integral with the gear H in order to turn therewith, mounted on the shaft of the crank arm H'. $h$ is a dog pivoted at $h'$ in the frame $A^5$ adapted to engage the ratchet wheel.

I is a depending leg secured to the rack bar F' having a foot portion $i$ engaging the arm $j$ of the discharge door J secured to the shaft J', in turn journaled in the side walls of the machine.

$J^2$ is a wall extending across the machine, having a horizontal portion $J^3$ to form a receiving tray or floor on which the merchandise is discharged.

K, K, are rocking arms pivoted at $k$, $k$, to the frame $A^5$, their forward ends having a V-shaped formation $k'$ adapted to enter between the pins $e^2$ of the coin disks acting as a dog to secure the coin disks against accidental rotation. The arms are also notched at $k^2$ to receive successively the pins $e^2$ of the coin disks to further assist in securing the disks against accidental rotation.

K' is a spring,—one end of which enters the shaft $k$; the other bears on the rocking arms K to hold the part $k'$ of the latter in locking relation between the pins of the coin disks.

$F^3$ is a spring engaged at one end with the spider frame $A^4$, the other end connected with the pin $f$ secured to the operating lever F. As will be seen by reference to Fig. 2, the pin $f$ when the operating lever is in its normal position, assists in supporting the end of the rocking arm K between the pins of the coin disk,—the lower part of the rocking arm having a projection at $k^3$ designed to rest upon the pin,—the projection being cut away at $k^4$ in order that the rocking arm may be depressed upon the rotation of the coin disks, whereby the coin disks are momentarily released from the control of the rocking arm, as indicated in Fig. 3.

L is a circular glass front through which the merchandise may be viewed, supported in grooves formed in the annular ring of the end walls of the machine, its end abutting with the sliding door L' also supported in said grooves.

$l$ is an up-turned lip integral with the door, slotted for the passage of a hasp or perforated bolt $l'$ having a screw-threaded shank engaged with the turnbuckle $A^3$,—the construction being such that the bolt is adapted to pass through the opening in the lip $l$, its projecting end being engaged by the padlock $l^2$, thereby locking the door and securing the turnbuckle against rotation.

$L^2$ is a fixed sheet metal wall inclosing the other half of the machine.

$L^3$ is a frame located in front of the machine at its base, having an opening $L^4$ through which merchandise discharged from the pockets of the drums may be withdrawn.

M is a coin chute to deliver the coins inserted in the machine to the pockets of the coin disks E and E'. In order to simplify the construction of the chute, it is formed of two castings M' and $M^2$, as shown in Fig. 10,—the casting M' having a central web $m$ projecting into the channel portion $m'$, of the casting $M^2$, thereby providing two distinct chutes for the coins whereby they may be delivered respectively to the disks E, or E'.

$m^2$ is a lug depending from the casting $M^2$, notched as indicated at $m^3$ for the passage of the bolt $m^4$ by which means the chute is secured to the end wall of the machine. The upper end of the castings M' and $M^2$, projects through an aperture $m^5$ provided for their reception in one of the arms of the spider frame A⁴, as indicated in Fig. 2,—the castings M' and M² are thus held in assembled relation without the use of bolts or other fastenings devices.

N is a glazed window formed in the end wall of the machine adjacent to the slot leading to the coin chute, through which the last few coins inserted in the machine may be viewed,—the object being to immediately expose to view any spurious coins or slugs inserted in the machine.

O is a coin box having spring side walls O' provided with projecting lips O² designed to suspend the box in the annular frame O³ attached to the spider frame A⁴, the former being secured to the frame A⁴ by the screw or bolt $b$ which also serves to hold the end plate in position. By compressing the side walls O' of the coin box between the fingers, it may be released from the annular frame O³.

Having indicated the several parts by reference letters, the construction and operation of the machine will be readily understood.

The drums are filled with the merchandise to be sold after first operating the crank arm H' until the rack bar F' of the operating lever F is approximately in the position indicated in Fig. 3. The discharge door J is thereby closed through the co-action of the depending leg I attached to the rack bar and the arm $j$ of the door. When in this position, the merchandise drums may be manually rotated by grasping the walls of the pockets through the opening closed by the door L',—the rocking arms K being forced to release the drums by the successive pins $e^2$ of the coin disks riding over the point $k'$ of the rocker arms, thereby forcing them down against the action of the springs K'; as indicated in the figure referred to. While the discharge door is in the position indicated in Figs. 3 and 10, the several pockets are successively charged with merchandise until the operation of loading them is completed. The door L' is then closed and secured against unlawful opening by means of the lock $l^2$ engaging the hasp $l'$ which projects through a slot in the lip $l$ of the door and has a screw-threaded engagement with the turnbuckle A³. It will thus be seen that the door and turnbuckle are securely held against tampering. Upon giving the crank arm H' a further rotation, the operating lever F is released and returned to its initial position through the action of the spring F' as indicated in Fig. 2. This operation also releases the discharge door J from its closed position with respect to the pocket of the merchandise drum, thereby permitting the contents of the first pocket,—being that at the time in line with the door,—to drop onto the floor of the tray J³, as indicated in Fig. 9. This article of merchandise is then removed by the party putting the machine in commission and the device is ready for use. Upon the insertion of a coin of the proper denomination in either division of the coin chute M, it is delivered to the coin disk in line therewith. The coin P drops into the pocket provided in the disk and between the tines of the forked casting G. Then upon operating the crank arm H' (which may be rotated in one direction only due to the joint action of the ratchet wheel H² and its dog $h$), the operating lever F is actuated and the casting G brought to bear against the projecting edge of the coin, which co-acting with the pins of the coin disk serves to rotate the disk and with it its respective merchandise drum to present the next succeeding merchandise pocket in line with the discharge door J. The discharge door at this point in the operation of the machine being closed (see Figs. 3 and 10) in order that there may be no opportunity to tamper with the merchandise drum when momentarily released from the control of the rocking locking arm K. A further operation of the crank arm H' brings the enlarged tooth H³ in contact with the last tooth of the rack bar F' (see Fig. 4) forcing the operating lever F to the limit of its movement and holding it in this position a brief period of time required for the passage of the tooth H³. The movement of the operating lever causes the pin $f$ to bear against the inclined way $k^5$ of the rocker arm K forcing the end $k'$ of the arm between the pins of the coin disks, thereby guarding the coin disks against a movement greater than that required to present the next pocket of the merchandise drum in line with the discharge opening,—which might otherwise occur if a greater weight of merchandise was on one side of the drum's axis than on the other, or by careless handling, or other causes. It has been found in practice that the enlarged tooth H³, of the gear H, serves to hold the operating lever at rest a period of time sufficient to insure the proper operation of the rocking locking dog with reference to the coin disks, even though the machine is carelessly actuated. Upon a further actuation of the crank arm H', the mutilated gear completes its cycle of rotation and the operating lever F is returned to its initial position through the action of the spring F³, as indicated in Fig. 2 of the drawings. In this position the pin $f$, co-acting with one of the pins $e^2$ of the coin disk entering the notched portion $k^2$ of the rocking arms K, serves to hold the disk against accidental rotation.

To provide for the delivery of the article of merchandise upon the insertion of the proper coin in payment thereof, even though the operating lever may have been left in other than its initial position through intent or carelessness of the last operator, the casting G is formed with a table portion $g'$ to receive and support the coin out of engagement with the coin disk (as indicated in Fig. 4) until by a further rotation of the crank arm H', the operating lever is released and returned to its initial position through the action of the spring $F^3$. The coin will then drop between the tines $g$ of the casting G into the underlying pocket of the coin disk, ready to co-act in the operation of the disk upon the crank arm H' being actuated as before described. As the coins are successively carried by the rotation of the disks adjacent to the coin box O, they roll out of the disk into the box from which they may be removed upon opening the door L' in the manner previously indicated.

Attention is directed to the fact that the pins $e^2$ forming the coin pockets of the disks E and E', are arbitrarily spaced so as to receive and support only a coin of predetermined denomination in position to be encountered by the casting G when brought to bear thereon through the operation of the lever F. The casting G is secured to the lever by a bolt projecting through a slot in the latter, whereby it may be readily adjusted when assembling the parts, to properly engage the coin delivered to the disk, that the disk and merchandise drum controlled thereby may be actuated upon the operation of the crank arm H'.

In the event of a coin being inserted smaller than that of the denomination required to operate the machine, it will slip between the pins down into the bottom of the machine, thus insuring against the operation of the machine by the insertion of a coin of other than the required denomination and value.

Having thus described our invention, what we claim is:—

1. In a vending machine, the combination of a frame, a coin disk having a plurality of peripheral coin pockets for supporting the coins with their periphery extending beyond the periphery of the disk, a coin chute to deliver coins to the disk, a swinging lever adapted to engage the periphery of the last inserted coin a distance equal to one of the pockets of the drum, and means extending through the frame adapted to actuate said swinging lever, substantially as described.

2. In a vending machine, the combination of a case, a frame for supporting the case, a coin disk having a plurality of peripheral coin pockets adapted to support the coins with their periphery extending beyond the periphery of the disk, a coin chute to deliver coins to the disk, a swinging lever adapted to engage the periphery of the last inserted coin, a discharge opening for the merchandise through the case, means for periodically closing said discharge opening actuated by said swinging lever, and means extending through the frame adapted for manually actuating the swinging lever.

3. In a vending machine, the combination of a frame, a coin disk having a plurality of peripheral coin pockets, the pockets of said disk adapted to support the coins with their periphery extending beyond the periphery of the disk, a coin chute to deliver coins to the disk, a swinging lever provided at one end with a forked member adapted to receive the coin between its tines whereby upon operating the lever the disk may be rotated, and means for actuating said lever, substantially as described.

4. In a vending machine, the combination of a frame, a coin disk having a plurality of peripheral coin pockets, the pockets of said disk adapted to support the coins with their periphery extending beyond the periphery of the disk, a coin chute to deliver coins to the disk, a swinging lever provided at one end with a forked member adapted to receive the coin between its tines, said member provided with a table portion to receive and support a coin delivered through the chute prior to the return of the lever to its initial position, and means for actuating said lever, substantially as described.

5. In a vending machine, the combination of a frame, a coin disk having a plurality of peripheral coin pockets to support the coins with their periphery extending beyond the periphery of the disk, a coin chute to deliver coins to the disk, a swinging lever provided with an adjustable forked member to engage the periphery of the last inserted coin, and means for actuating said lever whereby the disk may be rotated through the co-action of the coins.

6. In a vending machine, the combination of a frame, a coin disk having a plurality of peripheral coin pockets, a coin chute to deliver the coins to the pockets of the disk, a swinging lever adapted to engage the periphery of the last inserted coin through the co-action of which the merchandise drum is actuated, a segmental rack bar carried by said lever, a mutilated gear meshing with said rack bar to give the lever a pre-determined movement, and a crank arm journaled in the frame for manually rotating said gear.

7. In a vending machine, the combination of a coin wheel having peripheral pockets therein, a spring pressed member yieldingly co-acting with such pockets to resist the rotation of the wheel, a lever co-acting with the coin carried by the wheel for imparting motion thereto, said lever being adapted to co-act with said member at a pre-determined point in the movement thereof to positively force said member into engagement with the wheel-pocket.

8. In a vending machine, the combination of a frame, a coin disk having a plurality of peripheral coin pockets to support coins with their periphery extending beyond the periphery of the disk, a coin chute to deliver coins to the disk, a swinging lever adapted to engage the periphery of the last inserted coin, a segmental rack bar secured to said lever, a mutilated gear meshing with said rack bar adapted to operate the lever a pre-determined distance, means for manually rotating said gear, a spring actuated rocking arm, one end of which successively enters the coin pockets to secure the disk against accidental rotation but is adapted to be forced out of engagement when the disk is rotated through the operation of the lever, and a crank arm journaled in the frame for manually rotating said gear.

9. In a vending machine, the combination of a frame, a coin disk having a plurality of peripheral coin pockets to support coins with their periphery extending beyond the periphery of the disk, a coin chute to deliver coins to the disk, a swinging lever adapted to engage the periphery of the last inserted coin, a segmental rack bar secured to said lever, a mutilated gear meshing with said rack bar adapted to operate the lever a pre-determined distance, a spring actuated rocking arm, one end of which is provided with a V-shaped formation designed to successively enter the coin pockets to secure the disk against accidental rotation but adapted to be forced out of engagement when the disk is rotated through the operation of the lever, and a crank arm journaled in the frame for manually rotating the mutilated gear.

10. In a vending machine, the combination of a frame, a coin disk having a plurality of pins equidistantly placed near its periphery forming coin pockets adapted to support the coins with their periphery beyond the periphery of the disk, a coin chute to deliver coins to the disk, a swinging lever adapted to engage the periphery of the last inserted coin, a spring actuated rocking arm, one end of which is adapted to successively enter the coin pockets to secure the disk against accidental rotation but adapted to be forced out of engagement when the disk is rotated through the operation of the lever, a pin carried by the lever to assist in supporting said rocking arm in engagement with the pocket, said rocking arm being notched to release the support afforded by the pin when the lever is actuated, and means for actuating said lever.

11. In a vending machine, the combination of a frame, a coin disk having a plurality of pins equidistantly placed near its periphery forming pockets to support the coins with their periphery beyond the periphery of the disk, a coin chute to deliver coins to the disk, a swinging lever adapted to engage the periphery of the last inserted coin, a spring actuated rocking arm, one end of which is provided with a V-shaped formation $k'$ adapted to successively enter the coin pockets, a notched portion $k^2$ to receive one of the pins of the coin disk, a projection $k^3$ adapted to rest upon the pin carried by the rocking lever when in its initial position, a cut-away portion $k^4$ whereby the rocking lever may be released from the support of the pin, the pin carried by the lever to assist in supporting the rocking arm in engagement with the pocket, and means for actuating the lever.

12. In a vending machine, the combination of a frame, a coin disk having a plurality of peripheral coin pockets, a coin chute to deliver coins to the pockets of the disk, a swinging lever adapted to engage the periphery of the last inserted coin, a segmental rack bar carried by said lever, a mutilated gear meshing with said rack bar adapted to give the lever a predetermined movement, a spring for returning the lever to its initial position, and a crank arm journaled in the frame for manually rotating said gear.

13. In a vending machine, the combination of a case provided with a discharge door, a frame for supporting the case, a coin disk having a plurality of peripheral coin pockets, a coin chute to deliver the coins to the pockets of the disk, a swinging lever adapted to engage the periphery of the last inserted coin, a door to close the discharge opening through the case, means operated by the swinging lever to close said door, and means for actuating said swinging lever.

14. In a vending machine, the combination of a frame, a coin desk having a plurality of peripheral coin pockets, a coin chute to deliver the coins to the pockets of the disk, a swinging lever adapted to engage the periphery of the last inserted coin, a segmental rack bar carried by said lever, a mutiliated gear meshing with said rack bar adapted to give the lever a predetermined movement, a ratchet mounted on the shaft of said gear, a dog coacting therewith to insure the rotation of the gear in one direction only, a spring for returning the swinging lever to its initial position, and a crank arm journaled in the frame for manually rotating the mutilated gear.

15. In a vending machine, the combination of a case provided with a discharge opening, a frame for supporting the case, a coin disk having a plurality of coin pockets, a coin chute to deliver coins to the disk, a swinging lever adapted to engage the periphery of the last inserted coin, a segmental rack bar carried by said lever, a mutilated gear meshing with said rack bar adapted to give the lever a predetermined movement, a swinging door adapted to close the discharge opening in the case provided with an upstanding arm, a depending leg secured to the rack bar adapted to encounter said arm whereby the door may be periodically closed due to the operation of the swinging lever, and a crank arm journaled in the frame for manually rotating the mutilated gear.

16. In a vending machine, the combination of a frame, a coin disk having a plurality of pins equidistantly placed near its periphery forming coin pockets designed to support the coins with their periphery extending beyond the periphery of the disk, a swinging lever adapted to engage the periphery of the last inserted coin, a spring actuated rocking arm, one end of which is designed to successively enter the coin pockets to secure the disk against accidental rotation, a pin carried by the lever to assist in supporting the rocking arm in engagement with the pockets, a segmental rack bar carried by the swinging lever, a mutilated gear meshing with the rack bar provided with an enlarged tooth adapted to maintain the swinging lever for a brief period at the limit of its stroke, a spring to return the lever to its initial position following the passage of said tooth and means for actuating said gear.

17. In a vending machine, the combination of a frame, a pair of rotating merchandise drums provided with peripheral pockets, a shaft journaled in the frame on which the drums are mounted, one of said drums being keyed to the shaft, the other being free to turn thereon, a pair of coin disks also mounted on said shaft, one of which is directly secured with the merchandise drum loosely mounted on the shaft, the other being keyed to the shaft that it may rotate with the drum keyed to the shaft, said coin disks provided with peripheral pockets designed to support coins with their periphery extending beyond the periphery of the disks, a swinging lever mounted on the shaft adapted to engage the periphery of the last inserted coin in either or both disks through the co-action of which the respective merchandise drums may be partially rotated, and means for operating the swinging lever.

18. In a vending machine, the combination of a case, and frames for supporting the case, a rotating drum journaled in the frames provided with peripheral merchandise pockets, a coin disk adapted to rotate said drum provided with a plurality of peripheral coin pockets designed to support the coins with their periphery extending beyond the periphery of the disk, a swinging lever adapted to engage the periphery of the last inserted coin, means for operating said swinging lever, an arc-shaped sliding door closing the opening through which said merchandise drums are filled, provided with an upturned slotted lip, rods provided with turnbuckles engaging the end walls to secure the frames and case in position, a radial slotted bolt engaged with one of the turnbuckles adapted to extend through the slot of the upturned door lip, and a suitable lock to engage said bolt, substantially as described.

19. In a vending machine, the combination of a frame, a rotating coin disk adapted to operate said drum, said disk provided with coin pockets designed to expose a portion of the coin beyond the periphery of the disk, a coin chute to deliver the coins to the disk, and a glazed window in the frame adjacent to the coin chute and opening on the same plane with the coins supported in the disk, whereby the coins may be viewed from the outside immediately upon delivery to the disk.

20. In a vending machine, the combination of a frame, a pair of revolving coin disks, said coin disks provided with a plurality of pockets to support the coins, a coin chute formed in two parts, one portion channel-shaped in cross-section, the other T-shaped in cross-section with its central web portion extending into the channel portion of the other part forming separate channels leading to the respective coin disks, one of said castings provided with a depending lug by means of which it may be bolted to the frame, said frame provided with an aperture adapted to receive the end of the coin chute whereby the parts of said chute may be held in assembled relation, and means for manually rotating said disk through the co-action of the disk and last inserted coin.

In testimony whereof, we sign this specification in the presence of two witnesses.

SAMUEL R. BEAL.
JAMES D. CRANDELL.

Witnesses:
  FRED L. HUGHES,
  G. A. VAN DEUSEN.